Figure 1:
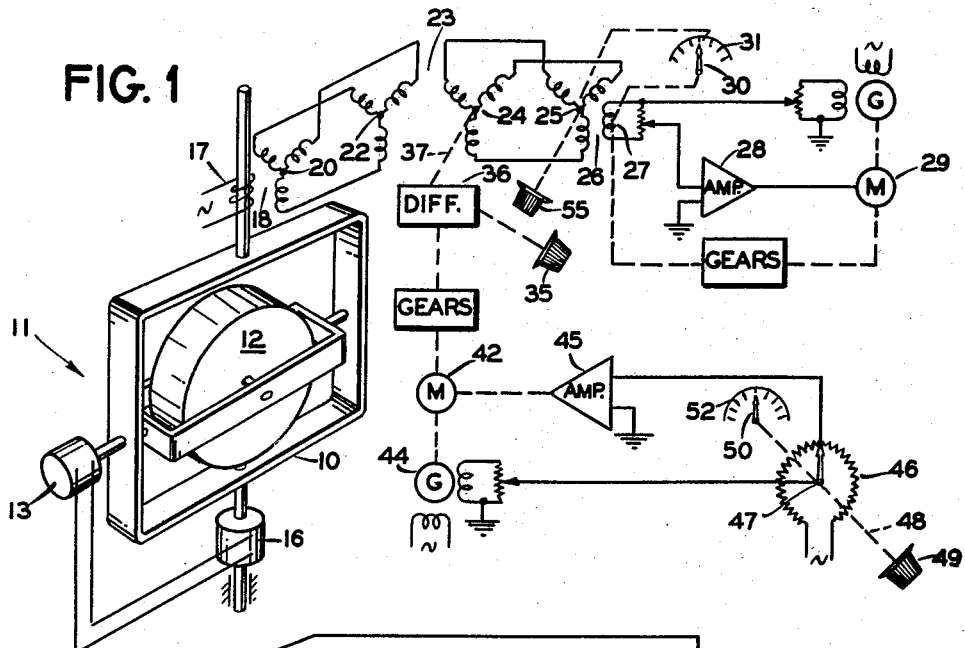

Nov. 8, 1960　　　F. J. THORNTON ET AL　　　2,958,953
INDICATION SYSTEM
Filed Feb. 15, 1956

INVENTORS
FRANCIS J. THORNTON
JOSEPH R. CONWAY
BY Oscar B Brumback
ATTORNEY

United States Patent Office 2,958,953
Patented Nov. 8, 1960

2,958,953
INDICATION SYSTEM

Francis J. Thornton, Englewood, and Joseph R. Conway, Bergenfield, N.J., assignors to The Bendix Corporation, a corporation of Delaware Filed Feb. 15, 1956, Ser. No. 565,726

3 Claims. (Cl. 33—204)

This invention relates generally to an indication system and more particularly to an indicating system for the navigation of a movable craft.

Deviations in either direction from a desired condition are easily recognized and corrected when a 12 o'clock position of an index relative to the indicia shows the desired condition. Difficulty is experienced, however, in adjusting the instrument for the desired condition when the condition is variable. With a heading control instrument, for example, if the 12 o'clock position of the instrument is North, the pointer will be at a 3 o'clock position if the craft is following a course East, unless a provision is made to shift the East reading to a 12 o'clock position. Heretofore, this shifting has been accomplished by disconnecting the instrument and moving the indicator of the dial. This, however, presents the disadvantage that, if a lurch or change in heading occurs during the interval of time that the instrument is disconnected, the resulting indication given by the instrument may not be the true heading.

An object of the present invention, therefore, is to provide a novel indicating and sensing system with a provision for changing the position of the indicator portion of the system relative to the sensing portion without disconnecting the indicating portion from the sensing portion.

Another object is to provide a novel directional control with provision for changing either the position of the index and indicia of the indicator relative to the sensing mechanism or the position of the index relative to the indicia without disconnecting the indicator from the sensing mechanism.

A further object is to provide a novel heading indicating system having an indicator and a directional gyro with means for correcting the directional gyro for latitude drift and for changing the position of the indicator relative to the directional gyro without losing the heading indication.

Still another object is to provide a novel system wherein a transmitter is actuated by a sensing device and an index is movable relative to indicia for indicating the sensed condition, the index being actuated by a receiver which is connected to the transmitter by way of a differential for changing or correcting the condition indication, and wherein a provision is made for changing the position of the index and indicia relative to the sensor without disconnecting the sensor and indicator.

The present invention contemplates a system wherein the directional information displayed on an indicator and obtained from a directional gyro is corrected for the apparent drift of the directional gyro due to earth's rotation and the indicator is adjustable so that deviation from any desired heading can be shown as displacement of a pointer from the 12 o'clock position on a dial.

The foregoing and other objects and advantages of the invention will appear more fully hereinafter from a consideration of the detailed description which follows, taken together with the accompanying drawing wherein two embodiments of the invention are illustrated. It is to be expressly understood, however, that the drawing is for the purposes of illustration and description, and is not to be construed as defining the limits of the invention.

Figure 2:
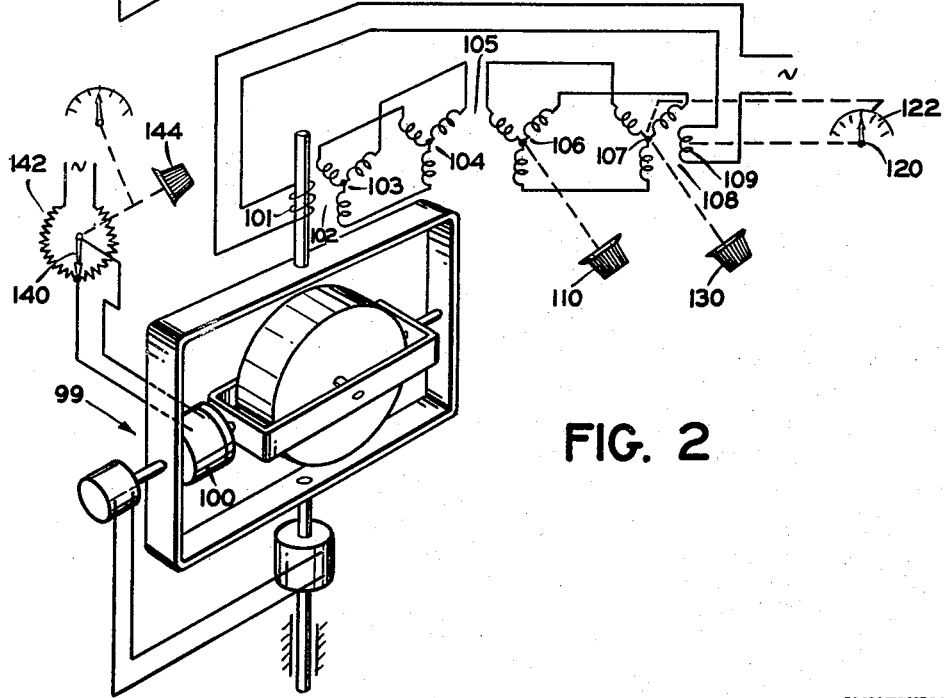

In the single sheet of drawing,

Figure 1 illustrates schematically an embodiment of the present invention for indicating the heading of a craft; and Figure 2 illustrates schematically another embodiment of the invention.

Turning now to Figure 1, the gimbal ring 10 of a directional gyroscope, denoted generally at 11, is suitably mounted on a movable craft so as to provide complete freedom of the ring about its vertical axis. Ring 10, in turn, pivotally supports a second ring 9 on a horizontal axis together with a conventional rotor 12 of a gyroscope rotatably mounted on a spin axis carried by the ring 9 for movement about the horizontal axis. The gyroscopic rotor 12 is caused to spin by a suitable means (not shown) about the normally horizontal axis of ring 9 and vertical axis of ring 10. Any tilt of rotor 12 about the horizontal axis of ring 9 relative to ring 10 actuates a suitable pick-off 13 to develop an output which operates a conventional torque motor 16 to exert a torque about the vertical axis of ring 10 and to restore the case to a level condition.

The vertical shaft of ring 10 is suitably connected in a manner to the rotor 17 of a transmitting inductive device 18 having a stator 20 which is fixed to the craft and which is connected to the stator 22 of a differential inductive device 23 whose rotor 24 is connected to the stator 25 of a receiver inductive device 26. When rotor 27 of receiver 26 is not at a null position relative to stator 25, an output is developed at rotor 27. By way of a conventional amplifier 28, this output operates a motor 29 to position rotor 27 at a null with respect to the electrical voltage in stator 25. Index 30 is also fixed with rotor 27, and indicia 31 is fixed with stator 25. The position of index 30 relative to indicia 31 gives heading information.

The ring 9 supporting the gyroscopic rotor 12 is free in the sense that no torquing device is provided for the horizontal axis of the ring 9. The arbitrary position which the spin axis of the gyro assumes after it reaches the rated speed is used as a fixed directional reference; and due to the random wandering effect of the earth's rotation at latitude of the craft, the gyro can drift about its vertical axis.

To give initial geographic significance to index or pointer 30 and indicia or dial 31, a knob 35 provides one input to a conventional differential 36 whose output 37 displaces the rotor 24 of inductive device 23 relative to stator 22 to change the position of the resultant voltage in stator 25. The resulting output from rotor 27 operates motor 29 to drive rotor 27 to a null position with respect to stator 25 and, at the same time, to move pointed 30 relative to dial 31.

To correct for the drift due to the earth's rotation, another input to the mechanical differential 36 is provided by way of a motor 42. The degenerative feed back of a conventional rate generator 44 causes motor 42 to rotate at a rate corresponding to the input signal voltage from a potentiometer 46 which is energized by a suitable source of alternating current. The wiper 47 of potentiometer 46 is fixed to a shaft 48 which is positioned in accordance with the setting of a knob 49 which positions a pointer 50 on the latitude graduated card 52 in accordance with the actual latitude of the craft. The displacement of wiper 47 from center develops an output signal proportional to the latitude of the craft. This signal fed to motor 42 through an amplifier 45 operates the motor at a rate to position rotor 24 of inductive device 23 relative to stator 22 at the same rate as directional gyro 11 positions rotor 17 of inductive device 18 relative to stator 20 due to the earth's rotation. These two effects cancel and rotor 27 remains at null with respect to the resultant voltage of stator 25.

If the craft be headed North with pointer 30 and dial 31 in such relationship that the pointer is in a 12 o'clock position for North, then, if the craft be headed East, the pointer will be at the 3 o'clock position of the dial. Knob 55 will then be turned to turn stator 25 and the East reading of dial 31 to a 12 o'clock position, and motor 29 will operate to maintain rotor 27 at a null position with respect to rotor 25, and, therefore, will change the position of the pointer so that pointer 30 will also be at the 12 o'clock position.

Gyro 11, once placed into operation, provides at transmitter 18 a positional reference which is corrected and given geographical significance by turning knob 35 to cause an output at differential 36 which will change the position of rotor 24 relative to stator 22 and change the resultant voltage at stator 25 so that motor 29 will drive rotor 27 and pointer 30 to a position corresponding to the true heading of the craft. Turning knob 49 to the latitude of the craft will drive motor 42 to correct the apparent drift. When it is necessary to change the desired heading of the craft, knob 55 is turned to displace the indicia to the 12 o'clock position at this desired heading and the pointer follows the indicia without disconnecting the indicator from the heading reference. Knob 35 may be turned to make any positional change between index 30 and indicia 31 which is necessary to provide other corrections.

Figure 2 illustrates another embodiment of the novel indication system of the present invention. The directional gyro 99 may be generally similar to gyro 11 described above with the exception that a conventional torque motor 100 is connected to the horizontal axis of the gimbal ring carrying the gyro rotor.

The vertical axis of gyro 99 displaces the energized rotor part 101 of an inductive device 102 or transmitter whose stator part 103 is connected to the stator part 104 of a differential inductive device 105 or operative connecting means whose rotor part 106 is connected to the stator part 107 of a receiver inductive device 108 having an energized rotor part 109. As is well known in synchronous inductive devices, the position of rotor 101 with respect to the stator 103 is reflected by the relative positions of rotor 109 and stator 107 through the inductive coupling 105 operatively connecting the transmitter 102 to the receiver 108. The positioning of rotor part 106 relative to stator part 104, however, changes the relative positions of rotors 101 and 109 of the transmitter 102 and receiver 108, respectively.

A pointer 120 is fixed with rotor part 109 as dial 122 is fixed with stator part 107 of the receiver means.

In accordance with the present invention, rotor part 101 is positioned by the directional gyro 99. However, the directional gyro 99 being free may assume a stable position that is not the true geographical heading of the craft. To give geographical significance to this stable position, rotor 106 is displaced by the turning of knob 110 until the relative position of rotor 109 with respect to rotor 107 gives pointer 120 and dial 122 a relationship showing the true heading of the craft.

To bring the dial and pointer to a 12 o'clock relationship, knob 130 is turned to position the stator to a 12 o'clock position. Due to the interaction of rotor 109 and stator 107, pointer 120 follows the movement.

To correct for the apparent drift of the directional gyro due to the rotation of the earth, the displacement of wiper 140 on potentiometer 142 by the turning of knob 144 supplies a signal to torque motor 100 to continuously exert a torque on the gyro and position the directional gyro at a rate at which it tends to cancel random drift.

The foregoing has described a novel navigation system wherein a free directional gyro is corrected for the apparent drift due to the earth's rotation and positions a pointer on a dial to show the heading of a craft; the pointer being movable relative to the dial to give geographical significance to the directional gyro position and the dial and pointer being movable together without losing craft heading to provide a 12 o'clock position for the desired heading.

Although but two embodiments of the invention have been illustrated and described, various changes can be made in the design and arrangement of the parts without departing from the spirit and scope of the invention as the same will now be understood by those skilled in the art.

We claim:

1. For use in a movable craft, a system comprising a directional gyro including a rotor, a first ring, said rotor having an axis carried by the first ring, a second ring, said first ring having a horizontal axis carried by the second ring, and said second ring having a vertical axis, indication means including indicia and an index, means connecting said gyro and indication means including transmitter and receiver inductive coupling means each having first and second parts, the first of said transmitter parts being fixed, the second of said transmitter parts being connected to said gyro for movement relative to said first transmitter part by said gyro in response to a change in heading of said craft, inductive coupling means to operatively connect the first transmitter part to the second of said receiver parts so as to effect adjustment of the first receiver part relative to the second receiver part to a position which is a function of the relative position of said first and second transmitter parts, means connecting said index to said first receiver part, means connecting said indicia to said second receiver part, manually operable means for adjusting said inductive coupling connecting means so as to effect a setting of said index relative to said indicia to a position showing true geographical heading of the craft, and other manually operable means for adjusting said second part of the receiver inductive coupling means relative to said first receiver part so as to cause said first receiver part to follow the adjustment of said second receiver part and said index and indicia to be simultaneously adjusted to a position such that a desired heading of the craft corresponds to a 12 o'clock position of said index and indicia and deviations by the craft from the desired heading cause said index to move to one side or the other of said 12 o'clock position.

2. An adjustable directional gyroscope arrangement comprising a directional gyroscope mechanism having a main gimbal pivotally mounted about a normally-vertical major suspension axis, an electrical transmitter unit producing an output of electrical signals characterizing relative angular orientations of said gimbal about said major axis, an electrical angular motion repeater unit including a stator structure and a rotor structure, said stator structure being angularly adjustable relative to the angular orientation of said gimbal about said major axis, a first azimuth indicator member operatively connected with said rotor structure for rotation therewith about an indicator axis, a second azimuth indicator member angularly adjustable with said stator structure and disposed in proximity with said first indicator member for cooperation therewith, said stator structure and second azimuth indicator member being thereby arranged for angular adjustment in relation to the angular orientation of said gimbal about said major axis, an electrical differential unit intermediate said transmitter and repeater units and including a control element movable to alter electrical signals applied to said differential unit, means applying said output of signals from said transmitter unit to said repeater unit through said differential unit such that relative angular orientations of said main gimbal are repeated in said repeater unit, operator-operative means for angularly adjusting said second indicator member and repeater unit stator structure in synchronism and to cause said repeater unit to effect simultaneous angular adjustment of said first azimuth indicator member, said second azimuth indicator member and said first azimuth indicator member being adjustable by said last mentioned operator-operative means and said repeater unit respectively to a position corresponding to a desired direction of heading so that upon a deviation in an actual direction of heading of a craft from the desired direction of heading said directional gyroscope mechanism, transmitter unit and repeater unit cause said first indicator member to be actuated to a position relative to said second indicator member corresponding to said deviation, and other operator-operative means for adjusting the control element of said electrical differential unit to alter the electrical signals applied thereto so as to cause said repeater unit to effect an auxiliary angular adjustment of said first indicator member, and said other operator-operative means being operable so as to cause said repeater unit to adjust said first indicator member to a position relative to said second indicator member indicating a true geographical direction of heading of the craft.

3. An adjustable directional gyroscope arrangement comprising a directional gyroscope mechanism having a main gimbal pivotally mounted about a normally vertical major suspension axis, an electrical transmitter unit having an electrically excited wound rotor structure angularly positioned by said main gimbal and a polycircuit-tapped wound stator structure producing an output of electrical signals characterizing relative angular orientations of said gimbal about said major axis, an electrical repeater unit including a rotor structure and a cooperating polycircuit-tapped wound stator structure, an azimuth indicator coupled with said rotor structure of said repeater unit for angular movement thereby, an azimuth indicia member fixed in relation to said stator structure of said repeater unit, said azimuth indicia member and repeater unit stator structure being simultaneously angularly adjustable with respect to the relative angular orientation of said gimbal about said major axis, an electrical differential unit having a polycircuit-tapped stator structure and a polycircuit-tapped rotor structure angularly movable in relation to said differential unit stator structure, means coupling said polycircuit-tapped stator structure of said transmitter unit with one of said polycircuit-tapped differential unit structures, means coupling the other of said polycircuit-tapped differential unit structures with said polycircuit-tapped stator structure of said repeater unit, manually operable means for angularly adjusting said azimuth indicia member and repeater unit stator structure to occasion simultaneous angular adjustment of said azimuth indicator and azimuth indicia member, said azimuth indicia member and said indicator being adjustable by said last mentioned means to a position corresponding to a desired direction of heading so that upon a deviation in an actual direction of heading of a craft from the desired direction of heading said directional gyroscope mechanism, transmitter unit and repeater unit cause said indicator to be actuated to a position relative to said indicia member corresponding to said deviation, and other manually operable means for angularly adjusting said differential unit rotor structure to cause said repeater unit to occasion angular adjustment of said azimuth indicator alone, said other manually operable means being operable so as to cause said repeater unit to adjust said indicator to a position relative to said indicia member indicating a true geographical direction of heading of the craft.

References Cited in the file of this patent

UNITED STATES PATENTS

| | | |
|---|---|---|
| 2,200,030 | Lauck | May 7, 1940 |
| 2,313,682 | Stuart | Mar. 9, 1943 |
| 2,334,116 | Meredith | Nov. 9, 1943 |
| 2,555,328 | Esval et al. | June 5, 1951 |
| 2,608,867 | Kellogg | Sept. 2, 1952 |
| 2,699,612 | Kellogg | Jan. 18, 1955 |

FOREIGN PATENTS

| | | |
|---|---|---|
| 566,663 | Great Britain | Jan. 9, 1945 |

UNITED STATES PATENT OFFICE
CERTIFICATE OF CORRECTION

Patent No. 2,958,953                      November 8, 1960

Francis J. Thornton et al.

It is hereby certified that error appears in the printed specification of the above numbered patent requiring correction and that the said Letters Patent should read as corrected below.

Column 2, line 58, for "pointed" read -- pointer --; column 4, line 43, for "receiver", first occurrence, read -- transmitter --.

Signed and sealed this 25th day of April 1961.

(SEAL)
Attest:

ERNEST W. SWIDER
Attesting Officer

DAVID L. LADD
Commissioner of Patents